United States Patent
Prater

(10) Patent No.: US 10,241,131 B2
(45) Date of Patent: Mar. 26, 2019

(54) METHOD AND APPARATUS FOR CHEMICAL AND OPTICAL IMAGING WITH A BROADBAND SOURCE

(71) Applicant: Bruker Nano, Inc., Santa Barbara, CA (US)

(72) Inventor: Craig Prater, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 15/249,433

(22) Filed: Aug. 28, 2016

(65) Prior Publication Data

US 2018/0059137 A1 Mar. 1, 2018

(51) Int. Cl.
*G01Q 60/18* (2010.01)
*G01Q 30/02* (2010.01)
*G01Q 60/06* (2010.01)
*G02B 21/00* (2006.01)

(52) U.S. Cl.
CPC ............ *G01Q 60/18* (2013.01); *G01Q 30/02* (2013.01); *G01Q 60/06* (2013.01); *G02B 21/002* (2013.01)

(58) Field of Classification Search
USPC .......................................................... 850/30
See application file for complete search history.

(56) References Cited

U.S. PATENT DOCUMENTS

| 5,473,434 | A | * | 12/1995 | de Groot | G01B 11/2441 356/514 |
| 5,602,820 | A | * | 2/1997 | Wickramasinghe | G11B 5/00 250/216 |
| 7,738,115 | B2 | * | 6/2010 | Ocelic | B82Y 20/00 356/501 |
| 9,213,313 | B2 | * | 12/2015 | Schnell | G03H 1/14 |

(Continued)

OTHER PUBLICATIONS

Amarie et al., "Mid-Infrared Near-Field Spectroscopy", Optics Express, vol. 17, No. 24, Nov. 23, 2009, pp. 21794-21801.

(Continued)

*Primary Examiner* — Phillip A Johnston
(74) *Attorney, Agent, or Firm* — Boyle Fredrickson S.C.

(57) ABSTRACT

Systems and methods that enable both spectroscopy and rapid chemical and/or optical imaging using a broadband light source. Broadband light sources may be advantageous for spectroscopy as they simultaneously illuminate a sample with a plurality of wavelengths and use interferometric techniques to determine a material response as a function of wavelength (or equivalently wavenumber). Some embodiments may enable the same radiation sources to be used to efficiently map the spatial distribution of chemical species or optical property variations. This may be achieved via selection of specific optical phase delays within an interferometer that are selected to maximize the contrast between different absorption bands or resonances within the sample. By optimally selecting specific interferometer phases it may be possible to construct images that substantially represent the (Continued)

material response to a specific wavelength excitation, without the necessity to obtain entire spectra at each sample location. This can provide orders of magnitude improvements in the measurement speed for required with a broadband source to provide compositional/optical property mapping.

25 Claims, 7 Drawing Sheets

(56) References Cited

U.S. PATENT DOCUMENTS 9,372,154 B2 * 6/2016 Prater .................... G01N 21/47
2018/0120097 A1 * 5/2018 Schick ............... G01B 9/02007

OTHER PUBLICATIONS

Pollard et al., "Infrared Vibrational Nanospectroscopy by Self-Referenced Interferometry", Nano Letters, vol. 16, No. 1, Dec. 21, 2015, pp. 55-61.

Huth et al., "Infrared-Spectroscopic Nanoimaging with a Thermal Source", Nature Materials, vol. 10, No. 5, Apr. 17, 2011, pp. 352-356.

* cited by examiner

Fig. 4A: S-SNOM configuration
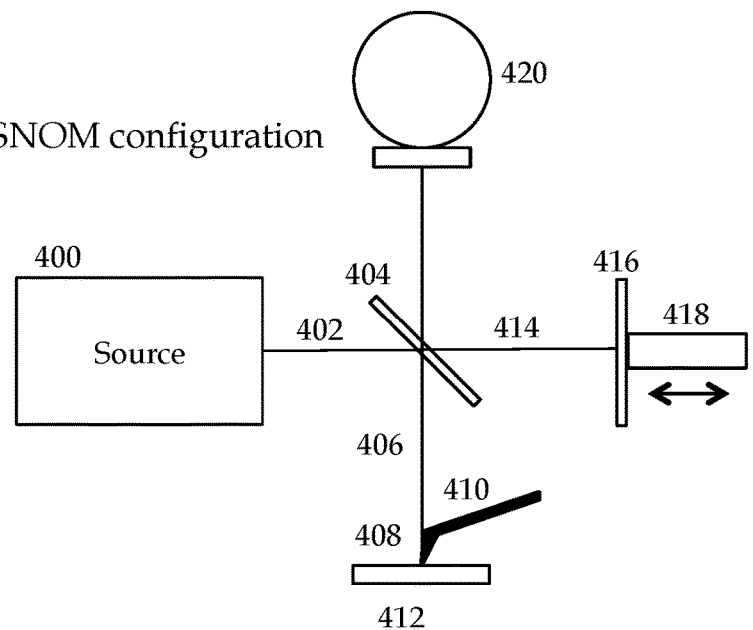
Fig. 4B: AFM-IR configuration
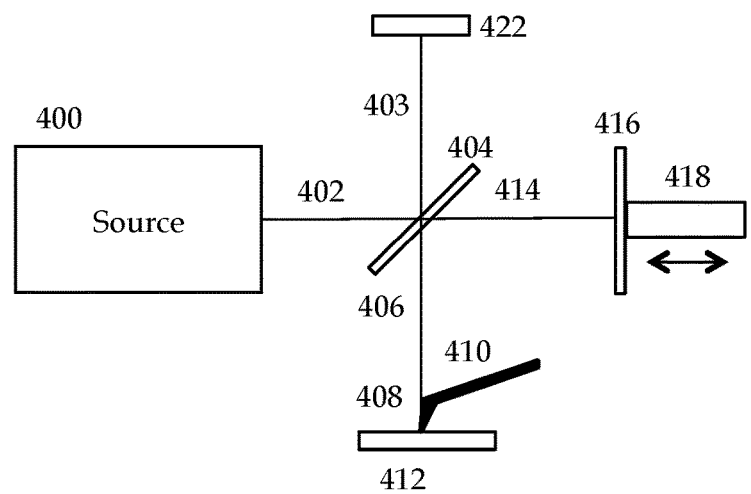

METHOD AND APPARATUS FOR CHEMICAL AND OPTICAL IMAGING WITH A BROADBAND SOURCE

The specification relates to scattering Scanning Near-Field Optical Microscopy (s-SNOM) and in particular to Infrared (IR) s-SNOM for acquiring information indicative of the optical properties and/or material composition of a surface using a broadband illumination source.

s-SNOM and in particular s-SNOM performed in the IR may be a useful technique for measuring and mapping optical properties/material composition of some surfaces with resolution approaching nanometer scale. Various aspects of the technique are described in U.S. applications Ser. Nos. 13/835,312, 14/322,768, 14/634,859, and 14/957,480 by common inventors and commonly owned with this application. These applications are incorporated by reference in their entirety.

BACKGROUND

Scattering scanning near field optical microscopy (s-SNOM) operates by interacting a sharp probe tip of a probe microscope with a sample surface and collecting light scattered from the region of tip-sample interaction. Using this technique, it is possible to measure the optical properties of samples with a spatial resolution far below the conventional diffraction limits. The resolution improvement comes from a local enhancement of the incident radiation field due to the sharp tip. The enhanced radiation field interacts with the sample and then scatters radiation into the far field. This near-field enhancement increases the amount of radiation scattered from the tip-sample region such that the scattered radiation can be more easily detected from nanoscale regions of a sample. Atomic force microscope based infrared spectroscopy (AFM-IR) provides chemical characterization and compositional mapping on nanometer length scales by using the tip of an atomic force microscope to locally detect absorption of infrared radiation.

BRIEF DESCRIPTION

In some embodiments, systems and methods are provided that may enable both spectroscopy and rapid chemical and/or optical imaging using a broadband light source. Broadband light sources may be advantageous for spectroscopy as they simultaneously illuminate a sample with a plurality of wavelengths and use interferometric techniques to determine a material response as a function of wavelength (or equivalently wavenumber). Some embodiments may enable the same radiation sources to be used to efficiently map the spatial distribution of chemical species or optical property variations. This may be achieved via selection of specific optical phase delays within an interferometer that are selected to maximize the contrast between different absorption bands or resonances within the sample. By optimally selecting specific interferometer phases it may be possible to construct images that substantially represent the material response to a specific wavelength excitation, without the necessity to obtain entire spectra at each sample location. This can provide orders of magnitude improvements in the measurement speed for required with a broadband source to provide compositional/optical property mapping.

In one embodiment of a first aspect, a method may be provided of measuring an optical property of a sub micrometer region of a sample including the steps of interacting a probe tip of the probe microscope with a region of the sample; illuminating the sample with a beam of light from at least one broadband radiation source; interfering a reference beam with at least one of (i) light scattered from the region of tip/sample interaction and (ii) light incident on the tip/sample interaction region, wherein the reference beam has an adjustable phase; adjusting the phase of the reference beam to selected values corresponding to substantially different optical response for at least two different wavelengths; measuring a signal indicative of an optical property of the sample at the selected reference phase value; and constructing at least one image of an optical property of the sample at a plurality of positions on the sample.

In one embodiment of a first aspect the broadband radiation source may be one of a femtosecond laser or a thermal infrared source or a beam from a synchrotron. In another embodiment of the first aspect the method further includes the step of repeating the above method steps to collect images at a plurality of reference phases. In another embodiment of the first aspect measurements of sample optical properties at different reference phases may be used to construct at least one of a compositional map of the sample, a map of an electronic property of the sample, or a map of distribution of chemical species in the sample. In another embodiment of the first aspect, the plurality of reference phases comprises a quantity of fewer than ten or preferably fewer than 5 reference phases.

I one embodiment of the first aspect, at least one of the reference phases may be selected to substantially maximize the signal indicative of the sample optical property at least one wavelength. In another embodiment of the first aspect, at least one of the reference phases may be selected to substantially maximize the difference between the signal indicative of the sample optical property between two wavelengths.

In another embodiment of the first aspect the optical property image may include at least 200×200 pixels and the time required to acquire the image may be one of less than 300 seconds or preferably less than 60 seconds. In another embodiment of the first aspect the signal indicative of the sample optical property may be at least one of the motion of the probe in response to radiation absorbed by the sample, the motion of the probe in response to a force induced on the probe by radiation interacting with the probe tip and sample, an oscillation amplitude of the probe in response radiation interacting with the sample, or determined from at least one signal from a detector that captures light scattered from the tip-sample interaction region.

In one embodiment of the first aspect the signal may be measured at a harmonic of a frequency of oscillation of the probe. In another embodiment of the first aspect the reference phase value may be selected by measuring interferograms of optical properties at a plurality of positions on the sample. In another embodiment of the first aspect the method further includes the step of using the interferograms to determine wavelengths at which there is a substantially different optical response at different positions on the sample. In another embodiment of the first aspect the method further includes the step of identifying at least two wavelengths $\lambda_1$ and $\lambda_2$ with substantially different optical response and selecting a reference phase by setting an optical path difference OPD that satisfies the equation $OPD=m\lambda_1=(n+1/2)\lambda_2$, where m and n are approximately integers. In another embodiment of the first aspect values of m and n may be selected to have a minimum offset from integer values.

In one embodiment of the first aspect the reference phase value may be selected by analyzing the interferograms using multivariate analysis to determine reference phases. In another embodiment of the first aspect the multivariate analysis determines reference phases that maximize a variance of interferograms measured at the plurality of sample positions.

In one embodiment of the first aspect the image of an optical property represents at least one of; chemical distribution of different chemical species, molecular conformation of molecules, molecular orientation, distribution of optical properties on a photonic material, structure, or device, distribution of biological molecules, an electronic property of a semiconductor material, or an electronic property of a 2D material. In another embodiment of the first aspect the multivariate analysis determines reference phases that maximize a variance of interferograms measured at the plurality of sample positions.

In one embodiment of the first aspect, the image may be constructed by solving for a set of parameters that describe one or more optical resonances as a function of position on the sample. In another embodiment of the first aspect the set of parameters may include amplitudes of the optical resonances. In another embodiment of the first aspect the image may include a compositional map of the sample. In another embodiment of the first aspect the solving step may include using measurements of the signal indicative of the optical property of the sample at the quantity of selected reference phase values to solve a system of a substantially similar quantity of equations.

In another embodiment of the first aspect the method further includes the step of assembling an overlay image comprising the optical response obtained at a plurality of different positions on the sample at different values of the reference phase. In another embodiment of the first aspect the overlay image may include pixels whose color intensity is set to a value indicative of an optical response of the sample at a position on the sample.

In one embodiment of a second aspect a system is provided for measuring an optical property of a sub-micrometer region of a sample, the system including a probe microscope with a probe tip, a broadband light source and an interferometer. The system may be configured to interact a probe tip of the probe microscope with a region of the sample; illuminate the sample with a beam of light from at least one broadband radiation source; interfere a reference beam with at least one of (i) light scattered from the region of tip/sample interaction and (ii) light incident on the tip/sample interaction region, wherein the reference beam has an adjustable phase; adjust the phase of the reference beam to selected values corresponding to substantially different optical response for at least two different wavelengths; measure a signal indicative of an optical property of the sample at the selected reference phase value; and construct at least one image of an optical property of the sample at a plurality of positions on the sample.

In one embodiment of the second aspect the broadband radiation source may be one of a femtosecond laser or a thermal infrared source. In another embodiment of the second aspect the reference phase value may be selected by measuring interferograms of optical properties at a plurality of positions on the sample.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIGS. 4A and 4B show simplified schematic diagrams of two measurement configurations that can be employed.

DETAILED DESCRIPTION OF ILLUSTRATIVE EMBODIMENTS

Figure 1:
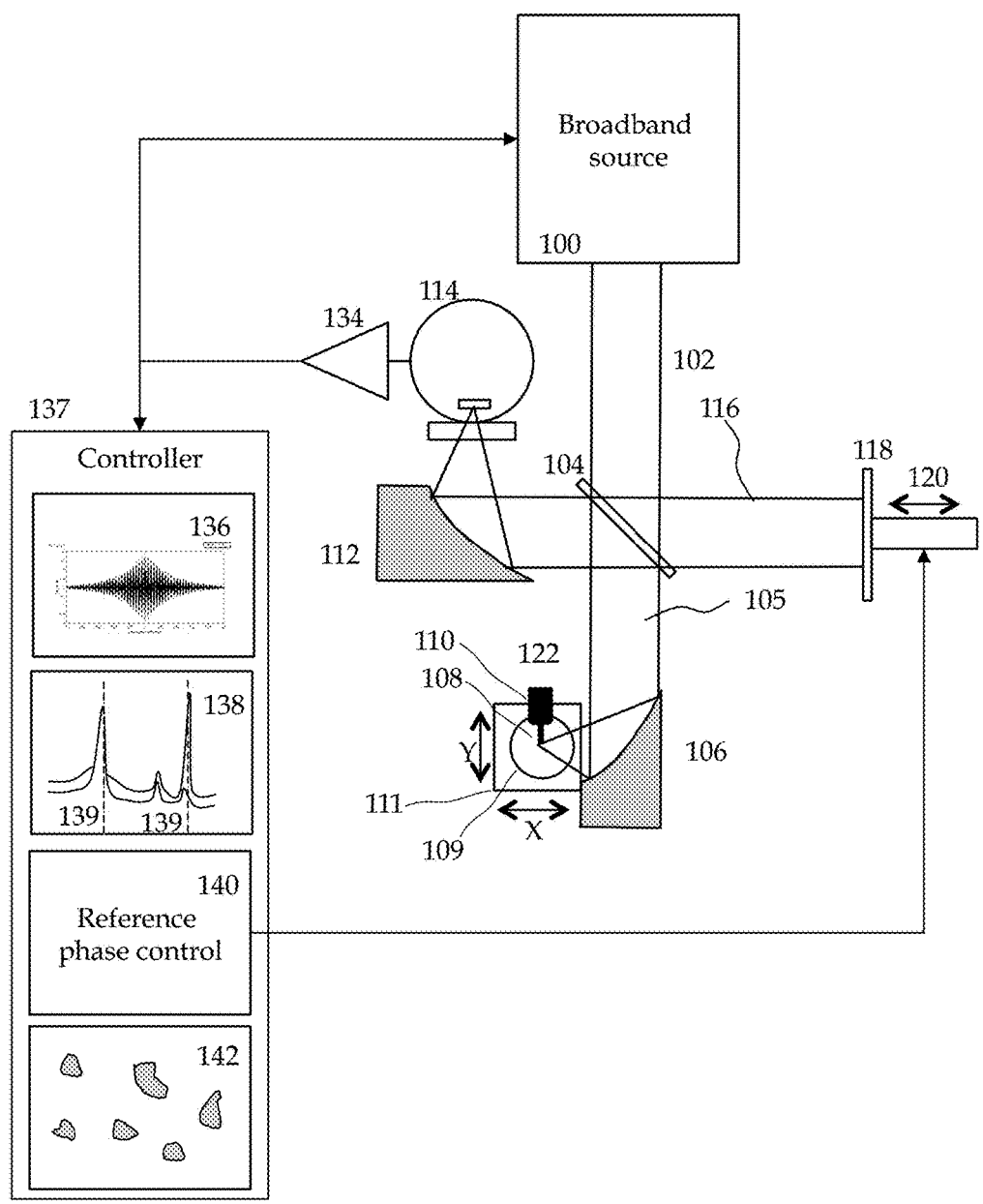
FIG. 1 shows a simplified schematic diagram of an illustrative embodiment.

Broadband radiation sources have been used extensively in spectroscopy. The most common examples are the blackbody thermal sources, e.g. globars, that are commonly used in infrared spectroscopy. Another example is broadband laser sources, for example femtosecond pulsed laser sources while another example is radiation from a synchrotron beamline. These source are used to illuminate a sample with a broad range of wavelengths simultaneously. Interferometric techniques are then used to discriminate the wavelength dependent response of the sample. Specifically a reference beam is interfered with a portion of the light from the source, either before or after interaction with the sample. The optical phase of the interfering beam is usually swept over a range of optical path differences while a signal indicative of an optical property of the sample is recorded. The resulting measurement of optical property versus optical path difference (OPD) is called an interferogram. Taking a Fourier transform of the interferogram results in a spectrum that resolves the wavelength dependence of an optical property of the sample. This technique works well for obtaining point spectra, i.e. a measurement of an optical property of a sample at a given point on the sample. But when it is desirable to map the optical property at many portions on a sample, for example to form an image of an optical property across a sample or to construct a compositional map, the use of a broadband source is much more problematic. The issue is that to make a map of a wavelength dependent optical response it may be necessary to obtain a whole spectrum at every point of interest on a sample. For a spectrum covering for example 1000-4000 cm-1 with 2 cm-1 spectral resolution would require 3000 data points during the interferometer reference mirror sweep. If the integration time for each measurement is 0.33 msec, it would require ~1 second to record a spectrum at a single point. And a hyperspectral image obtained over an array of 200×200 points would require 40,000 seconds or more than 11 hours. Depending on the signal-to-noise ratio, the required integration time for s-SNOM measurements can be on the scale of many seconds to even minutes. At these rates, hyperspectral imaging becomes even less practical.

One or more embodiments described herein may provide the ability to obtain full hyperspectral images to obtain chemical/optical images of a sample.

One or more embodiments described herein may provide high speed chemical/optical imaging with a broadband source by making interferometric measurements at a small number of carefully selected interferometric phases to achieve maximal contrast between different constituents of the sample surface.

DEFINITIONS

"Interacting a probe with a sample" refers to bringing the probe tip close enough to the surface of a sample such that one or more near field interactions occur, for example the attractive and/or repulsive tip-sample forces, and/or the generation and/or amplification of radiation scattered from an area of the sample in proximity of the probe apex. The interaction can be contact mode, intermittent contact/tapping mode, non-contact mode, pulsed force mode, and/or any lateral modulation mode. The interaction can be constant or as in preferred embodiments, periodic. The periodic interaction may be sinusoidal or any arbitrary periodic waveform. Pulsed force modes and/or fast force curve techniques may also be used to periodically bring the probe to a desired level of interaction with a sample, followed by a hold period, and then a subsequent probe retraction.

"Illuminating" means to direct radiation at an object, for example a surface of a sample, the probe tip, and/or the region of probe-sample interaction. Illumination may preferably include radiation in the infrared wavelength range, but other wavelengths may also be used. Illumination may include any arbitrary configuration of radiation sources, reflecting elements, focusing elements and any other beam steering or conditioning elements. The source of infrared radiation may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), nanosecond, picosecond and femtosecond laser systems, CO2 lasers, heated cantilever probes or other microscopic heaters, and/or any other source that produces a beam of infrared radiation. The source emits infrared radiation in a preferred embodiment, but it can instead or also emit in other wavelength ranges, for example from ultraviolet to THz.

"Scattering" or "scattered" refers to radiation emitted from a region in response to incident radation. Scattering can include a variety of mechanisms including elastic scattering, inelastic scattering, fluorescence, Raman scattering, and any other mechanism that involves radiation being emitted from a surface in response to incident radiation.

"Collecting radiation" means to collect radiation at or with a suitable radiation detector, for example at a photodiode, photoconductor or similar detector that converts an radiation into a current, voltage, temperature or other signal that can be measured.

"Spectrum" refers to a measurement of one or more properties of a sample as a function of wavelength or equivalently (and more commonly) as a function of wavenumber.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light or other response of a material due to the interaction with radiation.

"Interference," "Interfering," and "Interferometry" all refer to the coherent superposition of multiple electric field components from two or more sources. When interfering beams reach a detector intensity measured at the detector depends on the complex sum of the real and imaginary electric field components, or equivalently both the amplitude and optical phase of the electric field components.

"Reference beam" refers to an auxiliary optical beam that is interfered with either the sample scattered beam at the detector or the beam incident on the probe and sample.

"Signal indicative of" refers to a signal that is mathematically related to a property of interest. The signal may be an analog signal, a digital signal, and/or one or more numbers stored in a computer or other digital electronics." The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

"Broadband radiation source" refers to a source of radiation that emits over a plurality of wavelengths, with a full width half maximum emission bandwidth of greater than 50 cm-1 and preferably more than 200 cm-1 and more preferably more than 400 cm-1. The source of infrared radiation may comprise one or more of a large number of sources, including thermal or Globar sources, supercontinuum laser sources, frequency combs, difference frequency generators (DFG), sum frequency generators (SFG), harmonic generators, optical parametric oscillators (OPOs), optical parametric generators (OPGs), femtosecond laser systems, synchrotron light sources, heated cantilever probes or other microscopic heaters, and/or any other source that produces a beam of infrared radiation. The source emits infrared radiation in a preferred embodiment, but it can instead or also emit in other wavelength ranges, for example from ultraviolet to THz.

An s-SNOM system may include a Scanning Probe Microscope (SPM) which may be an Atomic Force Microscope (AFM). An SPM may include a probe which may be cantilever probe with a sharp tip. Cantilever probes are generally microfabricated cantilevers made from silicon, silicon nitride or other semiconductor based materials. Probes have also been fabricated from metals and polymeric materials. In general the probe only needs to have a sharp tip that can interact with the sample and support for some mechanism to detect the interaction, e.g. by the bending of the cantilever probe, or the change in resistance, resonance frequency or other property that is indicative of the interaction between the probe time and the sample. The interaction may be contact, non-contact, intermittent contact, tapping and/or any other method by which the probe tip is moved in close proximity with the sample surface and creates an interaction that can be observed and/or has an impact on an observable property of the probe. One or more scanning mechanisms (or scanners) is used to generate relative translation between the probe and the sample so that the probe can interact with and measure properties of a plurality of positions on a sample. The scanning mechanism can move either the probe, the sample or a combination thereof. The scanning mechanisms are usually piezoelectric devices, but can also employ other mechanisms like electromagnetic, electrostatic, electrostictive and other drive mechanisms that induce a desired motion in response to a given control signal or command. Scanners include, but are not limited to piezoelectric tubes, piezoelectric stacks, piezoelectric driven flexure stages, voice coils, and other mechanisms for providing precision translation. The SPM generally include a capability for measuring the motion, position and or other response of the probe tip and/or an object to which the probe tip is attached, e.g. a cantilever or a tuning fork or MEMS device, for example. The most common method includes using an optical lever system where a laser beam is bounced off the cantilever probe to measure deflection of the cantilever. Alternatives include self-sensing techniques like piezoresistive cantilevers, tuning forks, capacitive sensing and other techniques.

The s-SNOM system and methods also may include a variety of optical elements to enable illumination of the tip-sample region and collection of scattered light. Illumination of the tip-sample region means to arrange for light from a light source to be incident on a region of a sample where the tip interacts with the sample surface. In general the light is focused to a spot, although in general the focused light spot is much larger than the tip-sample interaction region. The light, however, is often "nanofocused" and/or intensified by the probe tip geometry and/or surface coating. Broadband sources may include optical parametric oscillators, optical parametric generators, picosecond, femtosecond lasers, or attosecond laser sources, frequency combs, second harmonic generators and other lasers, along with thermal sources such as globars and additionally institutional sources like synchrotrons. The s-SNOM system may include optics for directing light from one or more of the sources towards to probe tip and the tip-sample interaction region. These optics may include any number of lenses, mirrors, attenuators, polarizers, beam steering elements to direct and condition the beam prior to arriving at the tip sample region. The beam will generally be focused to a spot in the vicinity of the tip sample region. The focusing optic may include lenses and or reflective focusing elements, for example parabolic mirrors, including off axis parabolic mirrors. The s-SNOM system also may include collection optics to collect light scattered from the sample. These optics may be the same as optics used to deliver light to the tip, but may also be an alternative set of optics. The s-SNOM system may also include an interferometer to provide amplification and/or phase sensitive measurements. The interferometer may include a beamsplitter to split the light from the source along two paths. The beamsplitter can be a simple flat window, a wedged window, and/or either of these elements with coatings to improve performance. For example the beamsplitter may have a partially reflective coating on one surface and an antireflective coating on the other surface. The interferometer may also include a compensator plate to compensate for the finite thickness of the beamsplitter. The material of the beamsplitter may be selected to be optimal for the wavelength range of the source. It may be made for example of glass, quartz, silicon, germanium, KBr, KCl, ZnSe, ZnS, $BaF_2$, $CaF_2$ or other materials. The s-SNOM system may also include a detector to detect light scattered from the sample and/or reflected through the interferometer. The detector may be any number of optical detectors, including visible/UV/near-IR photodiodes, infrared detectors including mercury cadmium telluride detectors (MCT) deuterated triglycine sulfate (DTGS), pyroelectric detectors, bolometers, avalanche photodiodes or any other optical detector that can detect light and produce a corresponding output signal. The interferometer may be used to measure the optical properties of interfering light beam from the sample and from a reference arm. "Interfering" in this case means that the two beams are at least partially spatially overlapped at a detector. For coherent light sources an indication of interference is that if the phase of one of the light beams is adjusted it will cause a modulation of the intensity of the light at the detector as the two interfering beams go in and out of constructive and destructive interference.

The s-SNOM system and methods may include control elements or controller to facilitate data acquisition and control of the s-SNOM system. The controller may be a single integrated electronic enclosure or may comprise multiple distributed elements. The control elements may provide control for positioning and/or scanning of the probe tip and/or sample. They may also collect data about the probe deflection, motion or other response, measure the response of the optical detector, provide control over the radiation source power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs and may be implemented along with discrete circuit components to carry out one or more of the processes described herein.

FIG. 1 shows a schematic diagram of an s-SNOM system. A broadband radiation source 100 emits a beam 102 that impinges on a beam splitter (104). As will be discussed later, this beam splitter can be in a different position or different orientation for different embodiments. A portion of the beam 105 is transmitted through the beam splitter towards a focusing element 106. The focusing element can be a lens, mirror or combination thereof In one embodiment, the focusing element is an off axis parabolic mirror. The incident light beam is then focused by the focusing element 106 onto the surface of a sample 109 in the vicinity of a probe tip 108 of a probe 110 of a scanning probe microscope. A portion of the incident radiation that interacts with the sample surface in the vicinity of the probe tip 108 is scattered from the sample and collected by focusing optic 106, or alternately other collection optics (not shown). The intensity and optical phase of the scattered light carry information about the optical and/or chemical properties of the sample surface. In one embodiment, the collected light is directed back along the same optical path as the incident light 105 until it reaches the beam splitter 104. At this juncture, a portion of the scattered light is reflected towards another focusing optic 112, which in turn focuses it to a detector 114. Referring back to the $1^{st}$ beam splitter 104, a portion of the incident light 102 is reflected from the $1^{st}$ beam splitter to a reference mirror 118. The position of the reference reflector 118 can be rapidly adjusted by an actuator 120 to adjust the relative phase of this so-called reference beam. The reference beam is reflected off the mirror 118 with an adjustable phase and directed back to the beam splitter 104. A portion of the reference beam passes through the beam splitter and is also directed to focusing optic 112 and is also focused onto detector 114, where it combines with the radiation scattered from the sample surface. This combination results in optical interference between the tip-sample scattered radiation and the reference beam. The intensity of the light detected at detector 114 is then a function of both the relative intensities of the reference and scattered light and also the relative optical phase between the two beams. The relative phase can be adjusted by changing the position of reference reflector 118 as moved by actuator 120. A simple flat mirror and linear actuator are shown for simplicity, but other techniques for adjusting the relative phase of the reference beam can be used as well, for example a rotating retroreflector or other techniques to change the effective optical path difference between two beams.

To obtain a spectrum of an optical property of the sample, the relative phase of the reference beam is swept over a plurality of values and an interferogram 136 is collected via controller 137. The interferogram can comprise the strength of an optical signal detected by detector 114 as a function of optical path difference or equivalently as a function of the relative reference phase. The signal from detector 114 can be conditioned in any number of ways in advance of the interferogram. For example, it may be amplified, integrated, filtered, demodulated or otherwise conditioned to substantially maximize the sensitivity of the signal to the tip-sample scattered light and to minimize sensitivity to noise and/or background scattered light. One technique is to send the detector signal to an amplifier 134 and then to a lock-in amplifier (not shown). The lock-in amplifier can be used to demodulate a component of the detector signal that is at a harmonic frequency of an oscillation frequency of cantilever probe 110. Demodulating at the 2nd or 3rd or higher harmonic can substantially reduce or eliminate the presence of background scattered light. These techniques are described in more detail in the incorporated references.

The interferograms can be converted into spectra 138, by performing a fast Fourier transform (FFT) on the interferogram for example. The spectrum may consist of amplitude and/or phase components, or real and imaginary components, or equivalent constructions. The spectra 138 will usually contain one or more peaks that correspond to chemical/optical resonances in the sample. For example, they may correspond to chemical absorption peaks associated with specific molecular bond resonances. Alternately, the resonances may involve optical phenomena like antenna mode resonance, plasmon resonances, and other photonic resonances. The positions of these resonances may be analyzed to determine chemical, optical and even electronic properties of the sample.

The positions of major resonances 139 also provide information to help perform efficient chemical/optical imaging without requiring full hyperspectral images. As will be described in more detail below, there exist specific reference beam phases that can maximize the contrast between the optical signals measured at any two wavelengths. By performing measurements at a select number of reference phases, it is possible to construct optical property images 142 in a fraction of the time required to perform full hyperspectral images. Hyperspectral images are comprised of complete spectra at every image pixel and each spectrum at each image pixel are usually comprised of many tens or hundreds or even thousands of data points. This has required optical properties to be measured at a similar number of reference phases, i.e. many tens or hundreds or thousands of measurements. Using the teachings of the current disclosure, however, it not necessary to measure at a large number of reference phases. In one embodiment, the quantity of selected reference phases is less than ten and preferably fewer than five. The images 142 are obtained by measuring a signal indicative of a strength of light scattered from the sample at a small set of selected reference phases at a plurality of locations on the sample surface. This is achieved for example by scanning the sample 109 under the tip 108 using an XY translation stage 111, or by scanning the tip over the sample or any combination thereof. By careful selection of reference phases that maximize the contrast between certain resonances, rather than performing measurements over a full sweep of the reference phase, it is possible to create optical property images 142 in orders of magnitude less time than conventional hyperspectral imaging. For example, chemical/optical images can be obtained at a small number of reference phases, for example 2 or 3 or 4 phases, rather than at 3000. The reduction in the number of phase measurements required has a commensurate improvement in the amount of time required to acquire a chemical/optical image. For example, using the same 0.33 msec integration time chemical/optical image acquisition may only require (2 to 4)×0.33 msec per pixel (neglecting for the moment the phase adjustment time). So the same 200×200 pixel image would take between ~30-60 seconds, i.e. on the scale of a minute, rather than the scale of more than a work day. This technique offers a dramatic improvement in productivity versus the conventional limits of broadband sources. In practical terms it allows an instrument to measure many samples per day or many regions of a sample per day, rather than only one. Note that the actual time required for an optical/chemical image also needs to account for the time involved in switching between the desired reference phases. In one embodiment, this is only required once per image. Since the reference phase can easily be adjusted in much less than a second, this implementation has a negligible impact on the overall measurement time. In other embodiments, it may be desirable to make sequential measurements at the desired phase values for example every pixel or more preferably every scan line. In these cases it is necessary to consider how often the phase adjustment is being made and how long each phase adjustment step takes to calculate the total image time. Assuming a 0.1 second phase adjustment time that occurs after every scan line and 4 phases per line, this would add 4*200*0.1=80 seconds of additional imaging time, or a total time of around 140 seconds for 4 phases. While the phase adjustment time becomes a significant fraction of the total imaging time if performed every line, the total image time is still on the scale of minutes not the scale of many, many hours. It may be desirable to use slightly longer integration times and/or slower phase adjustment times to allow sufficient time for settling to improve the signal to noise, but in any case, the teachings of the current disclosure make it possible to acquire a 200×200 pixel image of optical properties in times less than 300 seconds, and preferably less than 60 seconds.

The optical property images 142 may be analyzed to determine a wide number of characteristics of the sample, for example chemical distribution of different chemical species, the molecular conformation of molecules and polymers, molecular orientation, the distribution of optical properties on a photonic material, structure, or device, the distribution of biological molecules and materials, the electronic properties of semiconductor materials, electrical and optical properties of 2D materials and other sample characteristics. The specific optical property that is measured can be absorption, reflection, dielectric constant, real, imaginary, and/or complex index of refraction, or any signal that is indicative of any of these properties or any combination of these properties. The measurement of optical properties can be used to infer electrical properties such as electrical conductivity, resistivity, impedance, Fermi level, carrier density. Optical property images may also be used to visualize or identify defects, grain boundaries, material domains, semiconducting junctions, etc.

Figure 2A:
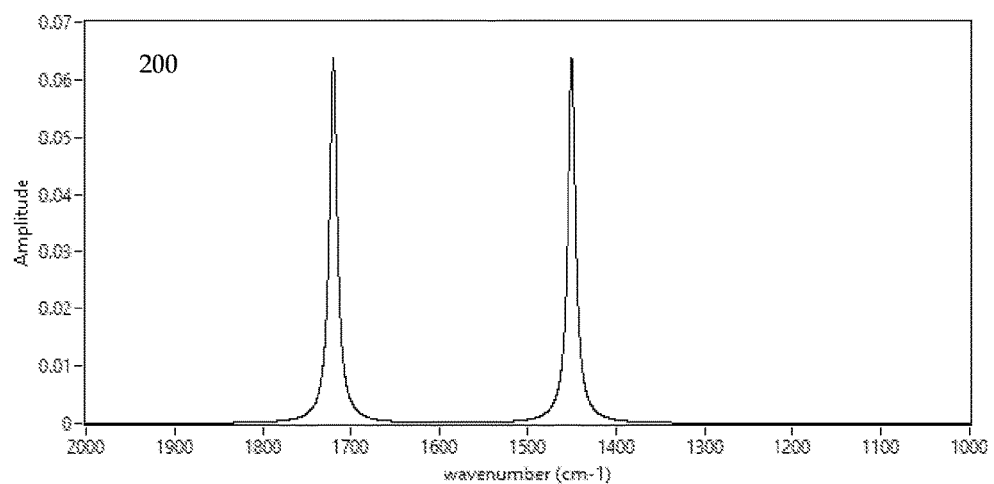
FIGS. 2A, 2B, 2C, 2D, and 2E show a simplified illustrations of aspects of the mechanism by which measured optical responses have different strengths at different reference phases.
Figure 2B:
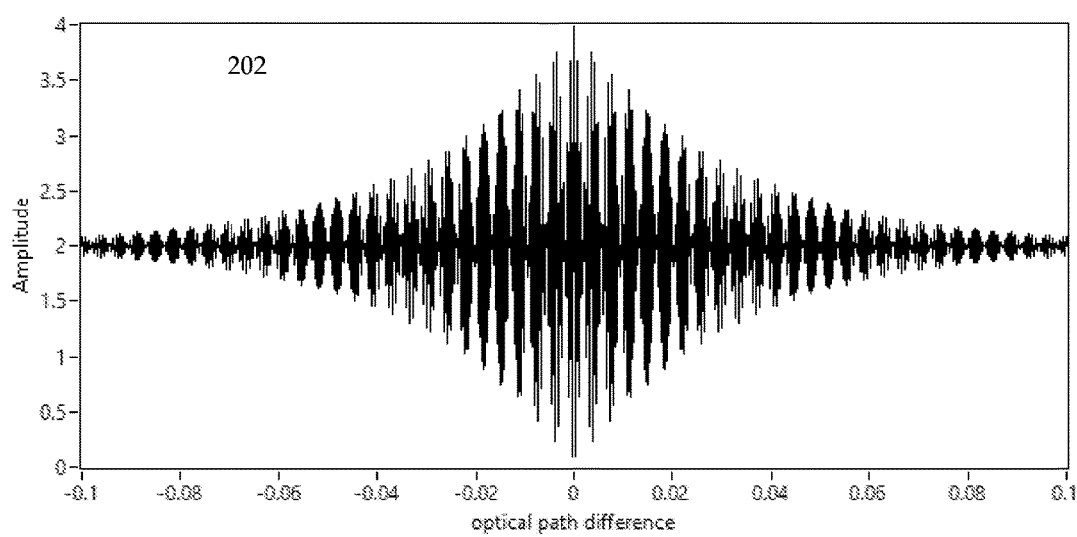
Figure 2C:
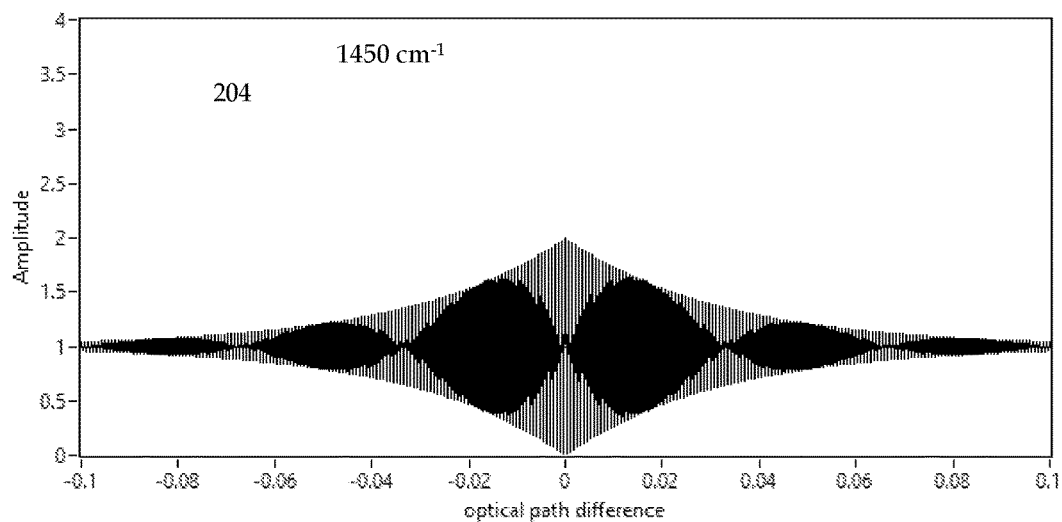
Figure 2D:
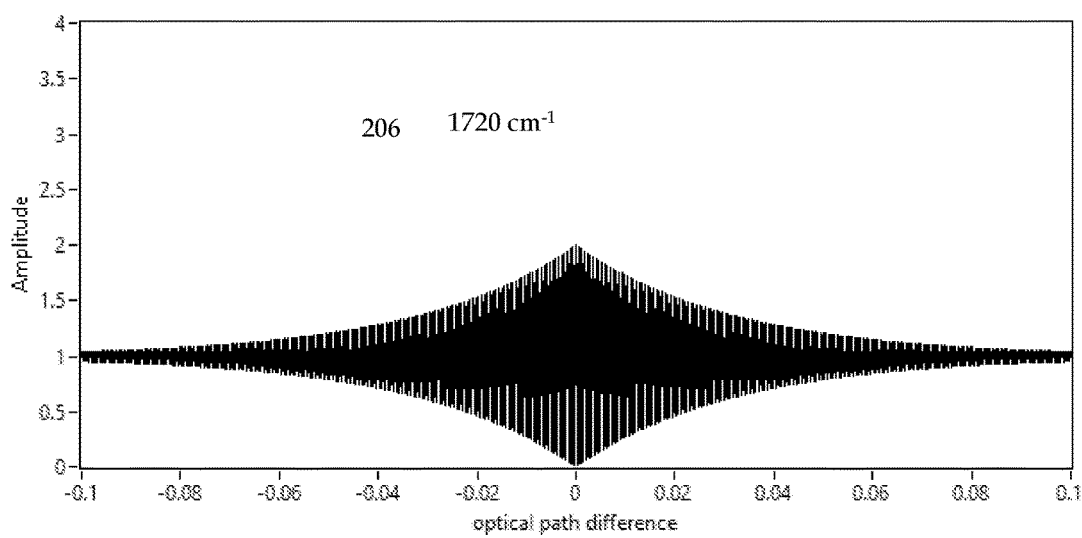
Figure 2E:
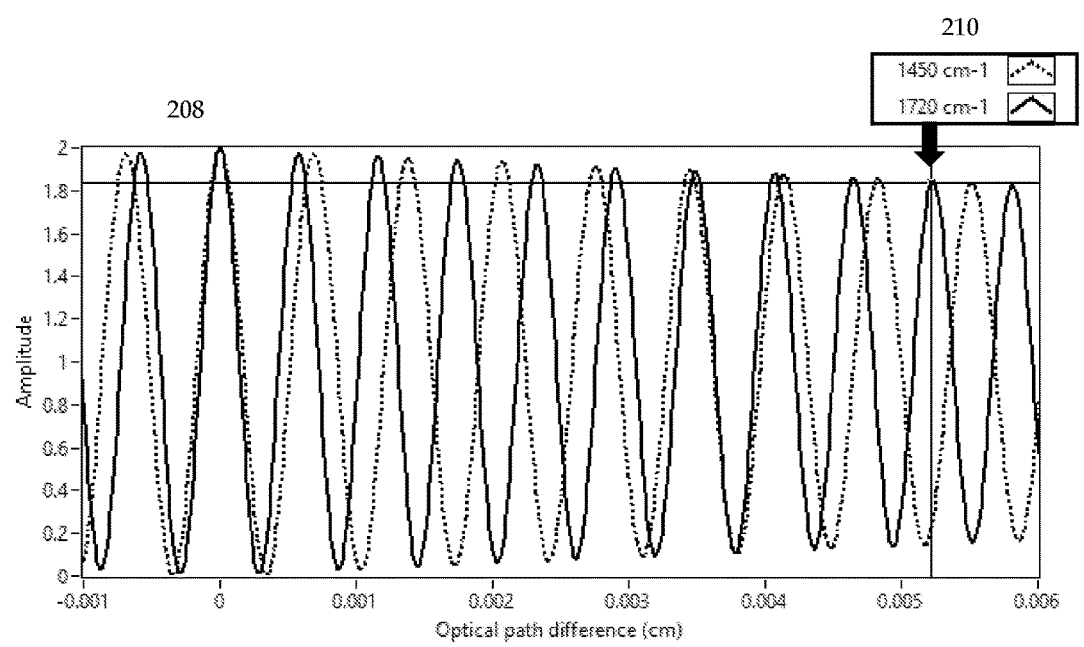

The improvement in measurement speed is obtained by selecting specific reference phases that provide optimal contrast between the optical responses at two or more wavelengths. This principle is illustrated in FIGS. 2A, 2B, 2C, 2D, and 2E. FIG. 2A shows a simple model of an optical spectrum with two resonances, in this case at 1450 cm$^{-1}$ and 1720 cm$^{-1}$. The resulting interferogram 202 shown in FIG. 2B that would be measured by on a sample containing these resonances would be a linear superposition of the interferograms for each of the constituent resonances, for example the interferogram 204 shown in FIG. 2C for 1450 cm$^{-1}$ and the interferogram 206 shown in FIG. 2D for 1720 cm$^{-1}$. (Actual interferograms will be more complex, resulting from additional resonances, the spectral nature of the source, and/or asymmetric nature of the interferometer. This is a simplified example that illustrates the underlying approach.) If we look more closely at the interferogram as seen in FIG. 2E, we note that there is a variable difference between the peak positions of the interferograms for 1450 cm$^{-1}$ and for 1720 cm$^{-1}$. In this example, if we choose a phase where the amplitude of the 1720 cm$^{-1}$ response is at a maximum where the 1450 cm$^{-1}$ is at a minimum, we can construct a chemical/optical map of the sample that maximally represents the sample's optical response at 1720 cm$^{-1}$ while minimally representing the sample's optical response at 1450 cm$^{-1}$.

For any given two wavelengths it is possible to choose one or more reference phase positions that maximizes the contrast in the optical response between those two wavelengths. The period between the interferogram peaks is given by the wavelength of the light at which the resonance occurs. For example, the wavelength at 1720 cm$^{-1}$ is roughly 5.8 µm, meaning that the peaks in the interferogram are spaced by 5.8 µm, i.e. every time that the reference beam is in constructive interference with the tip-sample scattered light. The interferogram for the 1450 cm$^{-1}$ optical resonance, however, has a peak spacing of 6.9 µm. While the response of these two wavelengths is in phase at zero optical path difference, they rapidly diverge due to the different oscillation in the interferograms period associated with the different wavelengths. To select an optical phase that maximizes the contrast between these two wavelengths, we preferably select a phase where one wavelength has maximum constructive interference and the other wavelength has maximum destructive interference. In mathematical terms, the desired optical path difference OPD is characterized by the following equation:

$$OPD = m\lambda_1 = (n + 1/2)\lambda_2; \qquad \text{Eq. 1}$$

Where $\lambda_1$ and $\lambda_2$ are the two wavelengths corresponding to optical resonances and m and n are integers. For most wavelength pairs, this equation will not have a solution where m and n are exact integers. But approximate solutions to this equation that maximize the contrast (and minimize the error in this equation) can be readily calculated. For example, it is possible to solve equation 1 for the integer m, giving:

$$m = \left(n + \frac{1}{2}\right)\frac{\lambda_2}{\lambda_1} \qquad \text{Eq. 2}$$

This equation can now be evaluated for successive integer values of n. We search for a value of n that gives a value of m that is acceptably close to an integer value. To determine if a solution is acceptably close to an integer, we can also calculate the resulting phase error, i.e. the offset from perfect constructive interference at one wavelength and destructive interference at the other wavelength. This can be calculated by recognizing that there is 360° of phase over one complete wavelength cycle and by determining what fraction of a full cycle is represented by the calculated value of m, i.e. how far it is off from the nearest integer value. In the specific example of resonances at 1720 and 1450 cm$^{-1}$, the first few solutions to Eq. 2 are:

| n | m | error from nearest integer | phase error (radians) |
|---|---|---|---|
| 0 | 0.42 | 0.42 | 2.65 |
| 1 | 1.26 | 0.26 | 1.66 |
| 2 | 2.11 | 0.11 | 0.68 |
| 3 | 2.95 | −0.05 | −0.31 |
| 4 | 3.79 | −0.21 | −1.30 |
| 5 | 4.64 | −0.36 | −2.28 |
| 6 | 5.48 | 0.48 | 3.01 |
| 7 | 6.32 | 0.32 | 2.03 |
| 8 | 7.17 | 0.17 | 1.04 |
| 9 | 8.01 | 0.01 | 0.05 |
| 10 | 8.85 | −0.15 | −0.93 |

Figure 3:
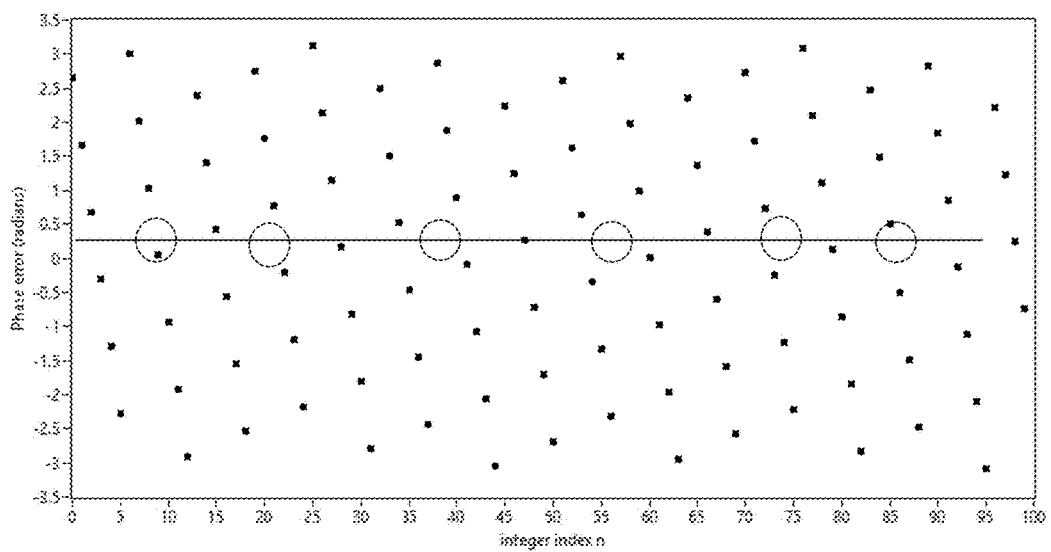
FIG. 3 illustrates a technique for selecting optimal values of reference phase.

As it can be seen, the value for n=9, gives a value of m that is fairly close to an integer, namely 8.01. This results in a phase error of only 0.05 radians. Selecting this phase results in almost complete constructive interference at one wavelength and destructive at the other. This point is indicated approximately by the black arrow 210 in FIG. 2E. FIG. 3 shows a plot of the relative phase error for a family of solutions to Equation 2. Six candidate solutions are shown where there is minimal phase error, i.e. the calculated values of m are relatively close to an integer value. Depending on how quickly the interferogram decays away from the zero path difference position (OPD=0), it may be possible to select values of m and n that give extremely small phase errors. Note that the unwanted contribution from signal from a resonance that is intended to be suppressed is proportional to sine of the phase error. In the example above with a phase error of 0.05 radians (and since sinθ~θ for small θ), this indicates that the contribution from the unwanted peak is only 5%, i.e. the contribution from the unwanted peak would be suppressed by 95%. In the case that the interferogram has a sufficiently large number of oscillation cycles, it is possible to achieve even further suppression of an unwanted peak. In the example shown, the value of n=60 results in a phase error of 0.01 radians, i.e. a 99% suppression of the unwanted peak. Optimally selected phases in a system with only two strong resonances can thus be used to acquire chemical/optical images with very high differentiation between the optical responses between the two peaks.

This method can be generalized to multiple resonance using a similar approach. This can be achieved in different ways. The most straightforward approach is to find simultaneous solutions to the integer equation for a plurality of wavelengths. That is, equation 1 can be generalized to:

$$OPD = m\lambda_1 = (n_i + 1/2)\lambda_i$$

Where there are a set of $n_i$ values for each i values of $\lambda_i$. For large numbers of wavelengths, this equation will become intractable, as it may not be possible to find a value of m and $n_i$ that produce acceptably small phase errors. The inventors have developed an alternate approach to deal with this problem. Specifically, it is possible to just solve Equation 2 for any unique wavelength pairs and obtain images that maximize the contrast between those two wavelengths.

Then the collection of images can be overlaid to mathematically or visually discriminate between different components. As an example, one can construct an RGB image from three data sets,
R=maximum contrast between $\lambda_1$ and $\lambda_2$
G=maximum contrast between $\lambda_2$ and $\lambda_3$
B=maximum contrast between $\lambda_3$ and $\lambda_1$
Even though there will be some contamination from the optical response of other wavelengths in each image, the composite image will clearly highlight the distribution of differences in chemical/optical properties based on the optical responses at the different selected wavelengths. This is analogous to the way human vision works, for example. The photoreceptors in the eye have maximal response at different center wavelengths. And even though each photoreceptor is sensitive over a range of wavelengths, the composite image overlaying the brightness maps at three different wavelengths results in the ability to discriminate multitudes of colors. The same principle applies in this case, where images collected at different optical phases can combine to create maps of the distribution of different chemical components and/or the distribution of optical/electronic properties. Such an overlay image can be created for example by creating an image whose pixels have a color intensity that is indicative of an optical response measured at a specific phase. For example the intensity of the red value for a pixel can be indicative of the optical response at a first phase, the intensity of a green at a second phase, the intensity of blue at a third phase. Note that for the image to discriminate the distribution of different chemical species on the sample or to map the variation in optical properties, it is not necessary that the selected phases have a maximal difference for different wavelengths. Instead it is only necessary that the optical responses are substantially different for different wavelengths at different phases.

It is also possible to apply more sophisticated multivariate analysis techniques to the selection of the optical phases. For example, one can acquire full interferograms at a plurality of locations on the sample, ideally where the plurality of locations represent the majority of the variability across the sample. So for example if there are three major chemical components in a sample, the measured data set should ideally include measurements obtained on different regions of the sample where different regions contain respectively higher concentrations of each of the three chemical components, i.e. some regions high in component A, some high in B, some high in C. (This can be readily seen from the spectra obtained from the FFT of the interferograms). A multivariate analysis on the interferograms can then be used to identify specific values of reference phases that provide maximal contrast between different chemical constituents and/or regions of different optical response. As an example, multivariate analysis can be used to determine which reference phases have the most statistically significant variations between regions of different chemical composition. These reference phases can then be selected to perform full images of the optical response of the sample. Multiple images at different phases can be overlaid to construct maps of the chemical composition of a sample and/or the distribution of different optical properties. This technique can be used for a very large number of applications. For example it can be used to visualize the distribution of drugs and other inert components in pharmaceuticals, to map different components in a multi-component polymer blend or composite, or multilayer film; to map the distribution of biomolecules and other biological materials in the life sciences; to measure and/or map electrical properties in semiconducting material;, to measure and map optical resonances in photonic materials; structures, and devices; and many other applications.

We have thus far disclosed approaches to improving the performance of scattering scanning near-field optical microscopy (s-SNOM) with a broadband source. However these techniques are not constrained to s-SNOM, however, and can be applied to AFM-based infrared spectroscopy (AFM-IR) and even conventional bulk IR spectroscopic imaging with a broadband source. FIGS. 4A and 4B shows simplified schematic diagrams of experimental configurations for using a broadband source with s-SNOM (FIG. 4A) and AFM-IR (FIG. 4B). The arrangement of FIG. 4A is the same as that of the one shown in FIG. 1, except that some components have been omitted for simplification and clarity. In FIG. 4A, the broadband source 400 emits a beam of radiation 402 that impinges on a beam splitter 404. A portion of the beam 406 is directed towards the sample 412 in the vicinity of a probe tip 408 of a probe 410 of a scanning probe microscope. A portion of the incident light is scattered from the tip-sample region, collected and directed back along the incident light path 406. (Focusing and collection optics mentioned in the description of FIG. 1 are omitted in this simplified figure.) A portion of this scattered light passes through beam splitter 404 and is incident on detector 420. A second portion of the light beam 402 from broadband source 400 passed through beam splitter 404 and continues on light path 414 to an optical phase shifter, for example created by reflector 416 on actuator 418. Light reflected from reflector 416 returns on path 414 back to the beam splitter 404 where it also strikes the detector, interfering the light scattered from the tip-sample region of the sample. Actuator 416 can be used to control the reference phase in the interferometer to selectively accentuate the response at desired wavelengths and selectively de-accentuate the response at other wavelengths, as described above. In this configuration the reference beam is interfered with the tip-sample scattered light. As we will see below, the AFM-IR configuration arranges the interference to occur at a different location in the optical path.

FIG. 4B shows a configuration for using AFM-IR with a broadband source. The arrangement is very similar to that of FIG. 4A, with the exception of the orientation of the beam splitter and the point at which the measurement of the optical response occurs. Referring to the labels in FIG. 4B, broadband source 400 emits a beam of radiation 401 towards a beam splitter 404. A portion of this light is reflected along light path 403 towards a fixed mirror 422 which is then reflected back along light path 403 towards the beam splitter. A portion of this reflected light passes through the beam splitter along light path 406 and is incident on sample 412 in the vicinity of tip 408 of probe 410 of a scanning probe microscope. Referring back to the light beam 402 emitted from source 400, a portion of this beam passes through beam splitter 404, continues on light path 414 until it strikes a movable reflector 416 on actuator 418. Light reflected from reflector 416 returns on light path 414 to beam splitter 404 where a portion of the light is reflected along light path 406, also striking the sample 412. At this point the light from the fixed arm of the interferometer (path 403) and the variable arm of the interferometer (light path 414) combine along light path 406 and are incident on the sample 412 in the vicinity of the probe tip 408. Thus the optical interference in this case occurs at the probe tip and sample, whereas in the s-SNOM configuration it occurs at the optical detector 420. In each case, however, a movable reflector 416 can be used to adjust the relative phase between the interfering light beams. This adjustment, in both cases, can be uses to select a set of optical phases to be used for imaging that provide substantial contrast between the optical responses at a select set of wavelengths. Notice that it is simple to convert between the two configurations in FIG. 4A and FIG. 4B. It is only necessary to rotate the orientation of the beamsplitter 404 and swap detector 422 with fixed mirror 422. Note also that the arrangements in both FIGS. 4A and 4B can be altered to arrange different components in either the transmitted or reflected arms of the beam splitter. For example, in FIG. 4B, the scheme works similarly if the fixed and moving reflectors are swapped. Or in FIG. 4A, it is possible to have the sample and tip in the transmitted arm of the beam splitter rather than in the reflected arm, i.e. swapping the probe/sample with the moving reflector. It is also possible to switch between arrangements of FIG. 4A and FIG. 4B with a flipper mirror.

Note that there are many other optical configurations that can achieve the same goals. For example, the use of a Mach Zender interferometer configuration arranges non-overlapping light paths, but still provides the ability to adjust a reference phase within the interferometer. It is also possible to switch between configurations analogous to FIGS. 4A and 4B with the use of flipper mirrors or rotating mounts to direct light along different beam paths as needed for the specific application.

In the case of the AFM-IR configuration, e.g. the configuration of FIG. 4B, the detection is performed by measuring the probe response resulting from the interaction of IR radiation with the sample. For example, radiation can be absorbed by the sample creating a thermal expansion that induces a force on the probe tip. Temperature sensing probes can also be used to directly sense the heat resulting from absorbed radiation. Alternately, the radiation can polarize the tip and sample to generate an electrostatic interaction and resulting force. A probe response due to the interaction of radiation from the sample can be obtained by measuring the probe deflection, oscillation, force, temperature, resistance, resonance frequency and/or any other property of the probe that changes in response to radiation interacting with the sample. The strength of one or more of these probe responses will vary as a function of the reference phase of the interferometer as different wavelengths from the broadband light source come in and out of constructive and destructive interference. Just as in the s-SNOM case, it is possible to select specific reference phases that maximize the contrast between the optical response at any two wavelengths, or more generally multiple wavelengths as described previously. So to summarize, this disclosure applies equally to configurations for s-SNOM and AFM-IR, where the use of carefully selected reference phases enables rapid measurements of the chemical/optical properties of the sample without the need to perform high density hyperspectral imaging, i.e. full phase sweeps at each XY sample pixel.

Figure 5:
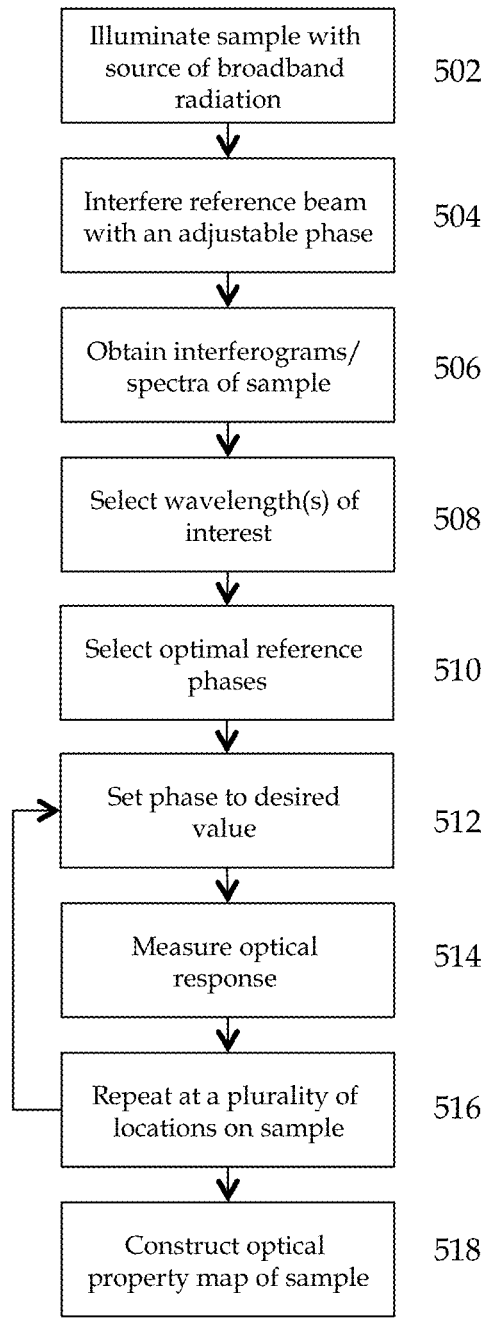
FIG. 5 shows a flow chart for a method embodiment.

FIG. 5 illustrates a method embodiment. In step 502, a region of the sample is illuminated via a source of broadband radiation. In step 504, a reference beam, usually a portion of the incident beam of radiation, is interfered with light along one of two paths, either the light going to the detector (420 in FIG. 4A) or light to the tip/sample region (light path 406 in FIG. 4B). The reference beam has an adjustable phase. This adjustable phase can be controlled for example created by varying the effective optical path difference (OPD) between the path of the reference beam and the path of the light not taken by the reference beam. This can be adjusted using an actuator and a moving reflector or by inserting an optical element into the path that changes the effective optical path length or any other means that adjusts the phase and/or optical path difference. In step 506, the adjustable phase is swept over a plurality of reference phases while measuring an optical response of the sample in response to the incident radiation to create one or more interferograms. The interferogram(s) can optionally be transformed into a spectrum or spectra. The interferograms and/or spectra can be analyzed to select one or more wavelengths of interest (step 508), typically based on wavelengths where there are strong optical responses that are indicative of a specific chemical or optical property of interest. For example, the wavelengths may be selected to correspond to a specific molecular absorption associated with a chemical species present in the sample. Or it may be selected to highlight a specific molecular orientation or conformation. It may also be selected to correspond to a specific photonic property, for example an antenna resonance, a plasmon or phonon polariton resonance or other photonic or plasmonics phenomenon. Once one or more wavelengths of interest are selected, corresponding optimal reference phases may be selected (step 510). These phases are preferable selected to provide substantial contrast in the optical responses between the selected wavelengths of interest. In the case of two wavelengths, the reference phase or phases may be selected to substantially maximize the difference in optical response between the two wavelengths. In the case of more than two wavelengths, optimal phases can be selected to substantially maximize the difference in optical response between pairs of wavelengths. Note, however, that it is not necessary to select phases that provide maximal contrast, it is only necessary that the different phases provide a different response for different wavelengths. The optimal reference phases may also be determined by multivariate statistical techniques that determine which phases provide the most statistically significant difference in the optical response through analyzing the variation in interferograms and/or spectra at the plurality of positions on the sample.

After optimal phases are selected, reference phase is set to a 1st value (step 512) and the optical response is measured. The optical response is preferably measured at a plurality of locations (step 516), and then the reference phase is set to a 2nd value (back to step 512). Steps 512-516 are repeated as often as desired until the number of desired sample phases and locations are completed. The optical responses at the plurality of sample positions and reference phases can then be analyzed to construct one or more maps of optical properties of the sample (step 518). These maps of optical properties can be used to map the chemical composition of a sample and other structural, optical and electronic properties as described previously. Note that it is not strictly necessary to perform each of the steps in this process to achieve beneficial results. For example, it is possible to omit step 508 where wavelengths of interest are determined. Instead it may be sufficient to analyze the interferograms to determine the phases that produce sufficient contrast without explicitly determining the associated wavelengths. Note also that the reference phase can be adjusted with different frequency according to the measurement speed requirements at the stability of the measurement system. For a highly stable system, it may be sufficient to adjust the phase after collecting a whole 2D array (e.g. 200×200 pixels) of optical responses at a given reference phase. Alternately, it may be desirable to adjust the phase after some number of measurement points, or after each scan line or after a select number of scan lines.

It is also possible to construct an approximate map of the sample's optical response using an algebraic approach using measurements at a finite and small number of reference phase steps. In this embodiment, prior knowledge is used of the form of the sample's optical response to dramatically reduce the number of variables in the system and then perform measurements at an efficient number of reference phases to determine the values of the reduced set of variables.

Specifically, this approach is enabled by employing two assumptions:

(1) The optical response of a sample at a given position is a linear sum of a finite number of optical resonances;

(2) The optical resonances can in turn be described by a small number of parameters.

Under these assumptions, it is possible to reduce the number of unknown variables to the product of the number of resonances times the number of parameters required to define the resonance. So for example, if there are 3 primary resonances in a sample's optical response and 3 parameters are required to specify each resonance (e.g. amplitude, center frequency, and width), then there are 9 unknowns at each sample point. To solve for these unknowns, it is sufficient to perform measurements of the sample's optical response at only 9 reference phases. Further, if the resonances have substantially fixed center frequencies and widths and only the amplitudes vary, this data set can be further reduced to just 3 variables, requiring only 3 reference phases. Since a normal interferogram to acquire a complete spectrum may include measurements at many tens, hundreds or even thousands of reference phases, the ability to reduce the required measurements to a small handful can provide an enormous efficiency improvement. The details of this approach are outlined below.

First we assume that the optical response $\beta(v)$ of the sample at a given position is a linear sum of a finite number optical resonances, defined by a limited number of parameters. For example:

$$\beta(v) = \sum_{i=1}^{n} a_i L(v_{i0}, \gamma_i); \qquad \text{Eq. 3}$$

where $L(v_{i0}, \gamma_i)$ is a peaked function, for example a Lorentzian or a Gaussian function in the case of that $\beta(v)$ is an absorptive spectrum, on an alternate related function for dispersive or other behavior. Each optical resonance under this model is defined by a small, limited number of parameters. In the case of a simple peaked function like a Lorentzian or a Gaussian function, the optical resonance parameters can comprise $\alpha_i$ as the amplitude of the ith optical resonance, and $v_{i0}$ as the center frequency and $\gamma_i$ as a parameter related to the peak width, or equivalently damping. Note that are large number of alternative formulations for the optical resonance, including a dispersive rather than an absorptive response, but in each case they can be described by a small finite number of parameters. We now consider the interferogram that would result from such an optical response. The interferogram $I(z)$ and the optical response spectrum $\beta(v)$ are Fourier transforms of each other. Ignoring constant offsets and scaling terms, $I(z)$ will have the form:

$$I(z) = \int_0^{\infty} \beta(v) e^{2\pi i v z} dv; \qquad \text{Eq. 4}$$

where z is the optical path difference or equivalently the reference phase. Plugging in the fact that the spectrum is a linear sum of optical resonances, we get an equation $$I(z) = \int_0^{\infty} \sum_{i=1}^{n} a_i L(v_{i0}, \gamma_i) e^{2\pi i v z} dv; \qquad \text{Eq. 5.}$$

Now recognizing that the individual resonance functions $L(v_{i0}, \gamma_i)$ are non-zero only in a small region around the resonance, we can transform this equation into the following:

$$I(z) = \sum_{i=1}^{n} a_i \left( \int_{v_{i1}}^{v_{i2}} L(v_{i0}, \gamma_i) e^{2\pi i v z} dv \right); \qquad \text{Eq. 6.}$$

where $v_{i1}$ and $v_{i2}$ are values of the radiation frequency above and below the center frequency $v_{i0}$ where the sample's optical response is zero. In effect we have changed an infinite integral to a sum of finite integrals over the regions of the spectrum $\beta(v)$ where the optical response in non-zero. Now if we make the simplifying assumption that the center frequencies $v_{i0}$ and peak widths $\gamma_i$ are substantially constant, and only their relative amplitudes $\alpha_i$ are changing as a function of position, then we recognize that the integrals within the sum will integrate to a constant value for each value of i. Now if we define variables $u_i$ as:

$$u_i(z) = \int_{v_{i1}}^{v_{i2}} L(v_{i0}, \gamma_i) e^{2\pi i v z} dv. \qquad \text{Eq. 7}$$

We can then rewrite the formula for the interferogram as:

$$I(z) = \sum_{i=1}^{n} a_i u_i(z). \qquad \text{Eq. 8}$$

In this form, it is clear that we have a simple system of linear equations. If our spectrum is composed of n optical resonances, we have n values of $\alpha_i$ to solve for. To solve for these constants, we can simply measure $I(z)$ at n different values of z, i.e. at n different values of the reference phase. Any suitable technique then to solve n equations for n unknowns can be applied to extract the values of $\alpha_i$. For example matrix inversion techniques can be applied as long as the values of the reference phase selected don't result in singular or degenerate matrices. The resulting values of $\alpha_i(x,y)$, where x and y indicate locations on the sample can indicate a map of the optical and chemical properties of the sample. For example, it may indication the strength of specific absorption bands at each point in the sample, or the reflectivity, or other optical, chemical and electronic properties discussed above. The values of $\alpha_i(x,y)$ can also be indicative of the chemical concentration of a specific chemical species and can thus be used to construct a compositional map of the sample. For example one can plot the values of $\alpha_i(x,y)$ for any selected value of i, create a ratio of $\alpha_i(x,y)$ values for different values of i.

The above example included the simplifying assumption that for a given optical resonance, the values of the center frequency $v_{i0}$ and peak width $\gamma_i$ were constant across the sample for a given value of i. This is often a reasonable approximation, especially for larger material domains or for highly immiscible materials. For some materials, however, there may be small shifts in the center frequencies (peak positions) or peak widths, especially at interfaces between two materials. In this case, it may not be desirable to employ the simplifying assumption that the center frequency and peak width are fixed. In this case, it is necessary to treat $v_{i0}$ and $\gamma_i$ as variables. To solve for these additional variables, it is necessary to obtain additional measurements of the interferogram I(z) at more reference phase values. As described above, it will in general be necessary to perform measurements at a quantity of reference phases corresponding to the number of optical resonances present in a sample times the number of parameters required to describe a resonance. So in the case of three Lorenztian peaks in the sample optical response, and three parameters required to specify each Lorentzian, it is necessary to measure and 3×3=9 different values of the reference phase. This is still many fewer reference phases than the many tens, hundreds or even thousands required to obtain a full resolution interferogram to acquire a full spectrum. As such it is possible to very efficiently construct images of a sample's chemical/optical properties with a broadband source in a very small fraction of the time required to complete full hyperspectral imaging.

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical and SPM control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

I claim:

1. A method of measuring an optical property of a sub micrometer region of a sample comprising the steps of:
   a. Interacting a probe tip of the probe microscope with a region of the sample;
   b. Illuminating the sample with a beam of light from at least one broadband radiation source;
   c. Interfering a reference beam with at least one of (i) light scattered from the region of tip/sample interaction and (ii) light incident on the tip/sample interaction region; wherein the reference beam has an adjustable phase;
   d. At least one of selecting or determining a limited number of reference phases that produce substantially different optical responses for at least two different wavelengths, wherein the limited number of reference phases is less than 10;
   e. Measuring a signal indicative of the optical property of the sample at only the limited number of reference phase values;
   f. Constructing at least one image of the optical property of the sample at a plurality of positions on the sample; and
      wherein the limited number of reference phases comprise a reference phase in which one of the at least two different wavelengths has maximum constructive interference and another of the at least two different wavelengths has maximum destructive interference.

2. The method of claim 1 wherein the broadband radiation source comprises at least one of: a femtosecond laser, a thermal infrared source, and a synchrotron.

3. The method of claim 1, wherein measurements of sample optical properties at different reference phases are used to construct at least one of a compositional map of the sample, a map of an electronic property of the sample, or a map of distribution of chemical species in the sample.

4. The method of claim 1 wherein the limited number of selected reference phases is fewer than 5.

5. The method of claim 1 wherein the optical property image comprises at least 200×200 pixels and the time required to acquire the image is one of less than 300 seconds or less than 60 seconds.

6. The method of claim 1 wherein the signal indicative of the sample optical property is at least one of: (a) the motion of the probe in response to radiation absorbed by the sample; (b) the motion of the probe in response to a force induced on the probe by radiation interacting with the probe tip and sample; (c) an oscillation amplitude of the probe in response radiation interacting with the sample; and (d) determined from at least one signal from a detector that captures light scattered from the tip-sample interaction region.

7. The method of claim 1 wherein at least one of the reference phases is selected to substantially maximize the signal indicative of the sample optical property at at least one wavelength.

8. The method of claim 1 wherein at least one of the reference phases is selected to substantially maximize the difference between the signal indicative of the sample optical property between two wavelengths.

9. The method of claim 6 wherein the signal is measured at a harmonic of a frequency of oscillation of the probe.

10. The method of claim 1 wherein at least one reference phase value is determined by measuring interferograms of optical properties at a plurality of positions on the sample.

11. The method of claim 10 further comprising the step of using the interferograms to determine wavelengths at which there is a substantially different optical response at different positions on the sample.

12. The method of claim 10 further comprising the step of identifying at least two wavelengths $\lambda_1$ and $\lambda_2$ with substantially different optical response and selecting a reference phase by setting an optical path difference (OPD) that satisfies the equation $OPD=m\lambda_1=(n+\frac{1}{2})\lambda_2$, where m and n are approximately integers.

13. The method of claim 12 wherein values of m and n are selected to have a minimum offset from integer values.

14. The method of claim 10 wherein the interferograms are analyzed using multivariate analysis to determine selected reference phases.

15. The method of claim 14 wherein the multivariate analysis determines selected reference phases that maximize a variance of interferograms measured at the plurality of sample positions.

16. The method of claim 1 wherein the image of an optical property represents at least one of: chemical distribution of different chemical species, molecular conformation of molecules, molecular orientation, distribution of optical properties on a photonic material, structure, or device, distribution of biological molecules, an electronic property of a semiconductor material, and an electronic property of a 2D material.

17. The method of claim 4 further comprising the step of assembling an overlay image comprising the optical response obtained at a plurality of different positions on the sample at different values of the reference phase.

18. The method of claim 17 wherein the overlay image comprises pixels whose color intensity is set to a value indicative of an optical response of the sample at a position on the sample.

19. The method of claim 1 wherein the image is constructed by solving for a set of parameters that describe one or more optical resonances as a function of position on the sample.

20. The method of claim 19 the set of parameters comprises amplitudes of the optical resonances.

21. The method of claim 20 wherein the image comprises a compositional map of the sample.

22. The method of claim 19 wherein the solving step comprises using measurements of the signal indicative of the optical property of the sample at the quantity of selected reference phase values to solve a system of a substantially similar quantity of equations.

23. A system for measuring an optical property of a sub micrometer region of a sample comprising a probe microscope with a probe tip, a broadband light source and an interferometer, the system configured to:
   a. Interact a probe tip of the probe microscope with a region of the sample;

b. Illuminate the sample with a beam of light from at least one broadband radiation source;
c. Interfere a reference beam with at least one of (i) light scattered from the region of tip/sample interaction and (ii) light incident on the tip/sample interaction region; wherein the reference beam has an adjustable phase;
d. Adjust the phase of the reference beam to at least one of a selected or determined limited number of values corresponding to substantially different optical response for at least two different wavelengths;
e. Measure a signal indicative of the optical property of the sample at only the limited number of reference phase values;
f. Construct at least one image of the optical property of the sample at a plurality of positions on the sample;
   Wherein the number of reference phase values at which the signal is measured is limited to less than 10; and
   wherein the reference phase values comprise a reference phase value in which one of the at least two different wavelengths has maximum constructive interference and another of the at least two different wavelengths has maximum destructive interference.

24. The system of claim 23 wherein the broadband radiation source comprises at least one of a femtosecond laser, a thermal infrared source, and a synchrotron.

25. The system of claim 23 wherein the reference phase value is determined by measuring interferograms of optical properties at a plurality of positions on the sample.

* * * * *